3,098,962
BATTERY CHARGING APPARATUS
Charles B. Berg, 819 E. 17th St., Kansas City 8, Mo.
Filed Mar. 28, 1961, Ser. No. 98,862
2 Claims. (Cl. 320—39)

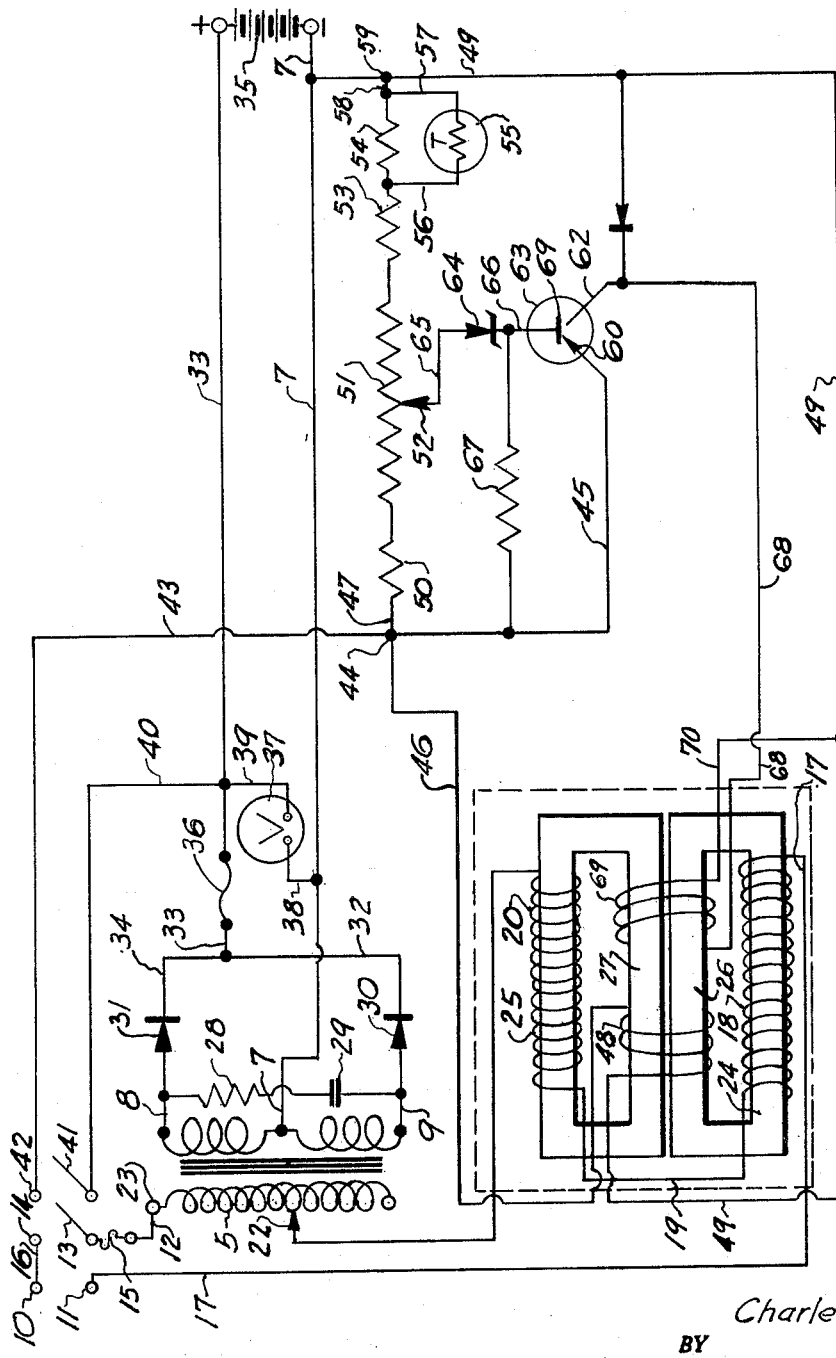

My invention relates to battery charging apparatus, and more particularly to a battery charger that supplies a substantially constant high current to a battery being charged until the battery reaches full charge and then reduces the current so that charging will be at a low or trickle charging rate.

It is a purpose of my invention to provide a battery charger that is compact and which provides for the two steps of charging, that is, at a rapid charging rate and at a trickle charging rate, said charger being provided with controlling means for determining when the change-over takes place from the rapid charging rate to the trickle charging rate, which controlling means is provided with no moving parts and which uses the actual E.M.F. of the battery to determine the charging rate and length of time thereof.

It is a further purpose of my invention to provide controlling means for a charger that includes a saturable reactor for controlling the impedance of the primary circuit of the transformer, which has a secondary that has full wave rectifying means interposed between the same and the terminals of the battery, and to provide means for varying the impedance of the reactor comprising a pair of oppositely wound windings mounted on said reactor so as to oppositely polarize the same, one of said windings being directly connected with the terminals of the battery and the other of said windings being connected at one end directly with one terminal of the battery and at the other end with the other terminal of the battery through a transistor, the conductivity of which is controlled by voltage responsive means, which is responsive to a voltage established by a voltage divider network, which establishes a voltage source that has a predetermined relationship to the output voltage of the battery.

More specifically, it is a purpose of my invention to provide means, in a charger of the above referred to character, for controlling a reactor comprising the pair of oppositely wound windings above referred to, that are of equal length so that when one winding is energized the reactor is polarized to reduce the impedance thereof progressively as the battery voltage increases, thus providing for a substantially constant high current supply to the battery that is being charged while the apparatus is adjusted to its high charging rate and when the other winding of the pair is energized also, such energization reduces the polarization of the reactor to zero and increases the impedance thereof to a maximum, reducing the alternating current flow through the primary winding to a minimum so that the trickle charging rate results, and to provide means for determining when direct current is supplied from the battery to said other polarizing winding of said reactor, including a transistor for completing the circuit between the terminals of the battery and the terminals of said second reactor direct current winding, the conductivity of the transistor being controlled by a zener diode connected with the base thereof, which is responsive to the voltage of a source determined by the voltage divider network and which source has a voltage that is directly proportional to the back E.M.F. of the battery, whereby, when the desired maximum voltage is reached, the zener diode will break down and negatively bias the base of the transistor, whereupon the transistor will conduct and current will flow from the emitter to the collector and through said other direct current winding of the reactor.

My controlling means provides a dependable accurate method of control without the use of any moving parts, such as relays, timers, or other wearing parts, the only moving part in the entire apparatus being a voltmeter. Furthermore my controlling system draws very low current and generates no heat, the reactor being controlled by low voltage current instead of by charging current, as is the case with series reactors.

Another purpose of my invention is the provision of temperature responsive means comprising a thermistor network providing inverse temperature compensation so that the zener diode will operate to cause the transistor to complete the circuit from the battery to the polarization nullifying winding at a battery voltage in proper ratio to ambient temperature.

Other objects and advantages of my invention will appear as the description of the drawing proceeds. I desire to have it understood, however, that I do not intend to limit myself to the particular details shown or described, except as defined in the claims.

In the drawings:

The FIGURE is a circuit diagram of my improved battery charging apparatus.

Referring in detail to the drawings, the primary winding 5 of a transformer having a secondary winding 6 provided with a center tap 7 and end taps 8 and 9, is supplied with current from an alternating current source having the terminals 10 and 11. One of the conductors 12 leading to one end of primary winding 5 is connected with the switching member 13 adapted to engage the stationary contact 14, through a fuse 15. Said stationary contact 14 is connected with the terminal 10 by the conductor 16 and a conductor 17 extends from the other terminal 11 to one end of an impedance winding 18, from which the conductor 19 extends to one end of the impedance winding 20, a conductor 21 extending from the other end of the impedance winding 20 to a movable contact 22 adapted to engage the winding 5 at any selected point along the same. Thus the portion of the primary winding 5 between the movable contact 22 and the terminal 23 with which the conductor 12 is connected, will be in series with the impedance windings 18 and 20.

The impedance winding 18 is wound on the one outer leg 24 of a reactor that has the impedance winding 20 wound on the other outer leg 25 of said reactor. Said reactor is made up of a pair of rectangular core members providing the closely adjacent inner legs 26 and 27 connected by the end transverse portions of the cores with the outer legs 24 and 25, respectively. The winding 18 is wound clockwise about the leg 24 as viewed from the left hand end of the reactor, as shown in the drawing, and the winding 20 is wound counterclockwise on the leg 25. Accordingly the impedance resulting from the one winding will be added to the impedance resulting from the other winding as the alternating current passes therethrough.

Extending across the terminals of the secondary winding 6 between the conductors 8 and 9 is a resistor capacitor network comprising the resistance 28 and the condenser 29, which provides protection to the silicon diode rectifiers 30 and 31, which provide for full wave rectification of the secondary winding current. From the diode 30 a conductor 32 extends to the conductor 33 and a conductor 34 extends from the diode 31 to the conductor 33. The conductor 33 extends to the positive terminal of the battery 35, which is being charged, while the tap 7 from the center of the secondary 6 extends to the negative terminal of the battery 35. A thermal-overload breaker or fuse 36 is interposed in the conductor 33 and a volt meter 37 is connected by the conductors 38 and 39 across the terminals of the battery by connection with the conductors 7 and 33, respectively.

A branch conductor 40 extends from the conductor 33 to a switching member 41, which is adapted to engage with a stationary contact 42 and said switching members 13 and 41 are preferably mounted to move in unison. From the terminal 42 a conductor 43 extends to a junction point 44, from which extend the conductors 45, 46 and 47. The conductor 46 extends to one end of a winding 48 wound around the legs 26 and 27 of the reactor, and a conductor 49 extends from the other end of said winding to the conductor 7 and thus to the negative terminal of the battery 35. The winding 48 will thus be energized continuously by the battery 35 whenever the switch 41 is closed, which would be during the entire time that the charging apparatus is in operation. Said winding 48 will polarize the legs 26 and 27 of the reactor in accordance with the direction in which the same is wound around the inner legs 26 and 27, which will also polarize the legs 24 and 25, reducing the impedance of the primary winding circuit so as to increase the current flow through the portion of the primary winding 5 connected in the circuit to the voltage of the battery 35.

A voltage divider network is provided between the conductors 43 and 49 comprising a resistance 50, a potentiometer comprising a resistor 51 and a movable contact 52, resistances 53 and 54 and a thermistor 55 connected across the terminals of the resistance 54 by the conductors 56 and 57, said resistance 54 and the thermistor 55 thus forming a thermistor network, the resistance 50, the resistor 51, the resistance 53 and the thermistor network being connected in series between the conductor 47 extending from the junction 44 and the conductor 58 extending from the junction 59 with the conductor 49.

The conductor 45 is connected with the emitter 60 of a transistor 61, which has the collector 62 and the base 63, said transistor being what is commonly know as a PNP power transistor, the transistor 61 being a semiconductor of which the emitter 60 is the anode and the collector 62 the cathode. A zener diode 64 is provided, which has the anode thereof connected with the movable contact 52 of the potentiometer by means of a conductor 65, and which has the cathode thereof connected by a conductor 66 with the base 63 of the transistor 61. A resistance 67 has its terminals connected with the conductors 45 and 66, which will cause the conductor 66 to be negative with respect to the conductor 45. The resistance 67 is provided to protect the operation of the transistor against operation with an open base, which would damage the transistor. The establishment of a point of negative potential with respect to the emitter 60 assures a current flow from the emitter to the base and through the zener diode toward the movable contact member 52 and through the voltage divider network to the negative terminal of the battery. The resistance 67 also operates to increase the flow of current through the zener diode after the critical voltage thereof has been reached. Also, when current flow through the zener diode increases, the thermistor 55 heats up, reducing its resistance and thus prevents flow through the zener diode from being interrupted by small voltage drops of the battery. Normally the thermistor only compensates for changes in resistance due to ambient temperature changes.

From the collector 62 a conductor 68 extends to one end of the winding 69, which is wound on the legs 26 and 27 of the reactor. The winding 69 has the same number of turns as the winding 48 and is wound in the opposite direction to the winding 48 so that direct current flowing through the winding 48 will cause the legs 26 and 27 to be polarized in one direction, while direct current flow through the winding 69 will cause the legs 26 and 27 to be polarized in the opposite direction. Accordingly when both windings are energized the polarization resulting from the flow of direct current through the winding 48 will be nullified by the flow of direct current through the winding 69. The other end of the winding 69 is connected with the conductor 70 that is connected with the conductor 49 leading to the negative terminal of the battery 35, a surge blocking diode 71 being interposed between the conductors 49 and 68. When the battery 35 is below the maximum voltage to which it is charged, the transistor will not conduct any current from the conductor 45 to the conductor 68 and the winding 69 will not be energized. However, when the voltage of the battery 35 reaches the desired maximum, then the voltage at the point at which the movable contact 52 engages the resistor 51 will be such that this voltage impressed on the zener diode will cause the same to conduct, supplying a negative bias to the base of the power transistor such that the transistor will conduct and current will flow from the emitter 60 to the collector 62, completing the circuit between the positive terminal of the battery 35 through the conductors 33, 40, switching element 41, stationary contact 42, conductors 43, 45 and 68 through the winding 69 and conductors 70, 49 and 7 to the negative terminal of the battery 35.

The winding 69 will accordingly be energized, when such voltage of the battery 35 is reached, and the polarizing action thereof will counteract the polarizing action of the winding 48 so that the reactor will become unsaturated and the maximum impedance due to the windings 18 and 20 of the reactor will be produced, thus reducing the primary current flow to such a point that the full wave rectifier interposed between the battery and the secondary of the transformer will only produce a trickle charge of the battery 35.

What I claim is:

1. In a battery charger, a transformer, a reactor having a core provided with a pair of outer legs and a pair of closely adjacent inner legs, an impedance winding on each of said outer legs, said windings being serially connected with each other and with a variable portion of the primary winding of said transformer, means for supplying current from an alternating current source through said impedance and portion of said primary winding in series therewith, a pair of windings wound oppositely around said pair of adjacent inner legs, a battery, full wave rectifying means interposed between said battery and the secondary of said transformer, the terminals of said battery being connected with one of the windings of said pair to increasingly polarize said inner legs and progressively reduce the impedance of said reactor as the battery voltage increases and means for supplying direct current from said battery to the other winding of said pair upon said battery reaching a predetermined maximum voltage comprising a semi-conductor having its anode directly connected with one of said battery terminals and its cathode directly connected with one end of said other winding, voltage responsive means controlling the conductivity of said semi-conductor, and means connecting the other end of said other winding directly with the other terminal of said battery, said voltage responsive means comprising a voltage divider network including a resistor, a contact adjustable along said resistor to establish a voltage source having a predetermined relationship to the output voltage of said battery, and a zener diode having its cathode connected with the controlling terminal of said semi-conductor and its anode connected with said adjustable contact.

2. In a battery charger, a transformer, a reactor having a core, impedance windings on said core in series with each other and with the primary of said transformer, means for supplying current from an alternating current source to said windings, a pair of oppositely wound windings of equal length on said core, a battery, full wave rectifying means interposed between said battery and the secondary of said transformer, the terminals of said battery being connected directly with one of said windings of said pair, and means for supplying direct current from said battery to the other winding of said pair upon said battery reaching a predetermined maximum voltage comprising a transistor having its emitter directly connected with one of said battery terminals and its collector directly connected with one end of said other winding, voltage responsive means controlling the conductivity of said transistor, and means connecting the other end of said other winding directly with the other terminal of said battery, said voltage responsive means comprising a voltage divider network including a resistor, a contact adjustable along said resistor to establish a voltage source having a predetermined relationship to the output voltage of said battery, a resistance in series with said resistor, a thermistor connected in parallel with said resistance, and a zener diode having its cathode directly connected with the base of said transistor and its anode directly connected with said adjustable contact.

References Cited in the file of this patent

UNITED STATES PATENTS

| | | |
|---|---|---|
| 1,788,152 | Dowling | Jan. 6, 1931 |
| 2,751,545 | Chase | June 19, 1956 |
| 2,978,633 | Medlar | Apr. 4, 1961 |

OTHER REFERENCES

"Battery Chargers and Charging," Harvey, London, 1953, page 158.

Basic Theory and Application of Transistors, Army TM 11-690, March 1959, pages 90 and 91.